United States Patent
Ishida et al.

(10) Patent No.: US 6,869,656 B2
(45) Date of Patent: Mar. 22, 2005

(54) OPTICAL INFORMATION RECORDING MEDIUM

(75) Inventors: Toshio Ishida, Kanagawa (JP); Takeshi Kakuta, Kanagawa (JP); Shinji Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/305,978

(22) Filed: Nov. 29, 2002

(65) Prior Publication Data

US 2003/0138592 A1 Jul. 24, 2003

(30) Foreign Application Priority Data

Nov. 30, 2001 (JP) ........................................ 2001-366190

(51) Int. Cl.⁷ ................................................ B32B 3/02
(52) U.S. Cl. .................... 428/64.1; 428/64.4; 428/64.8; 430/270.14
(58) Field of Search ............................... 428/64.1, 64.4, 428/64.8, 913; 430/270.14, 270.15, 270.2

(56) References Cited

U.S. PATENT DOCUMENTS

| 5,786,124 A | | 7/1998 | Chapman et al. |
| 2002/0197561 A1 | * | 12/2002 | Berneth et al. ........ 430/270.15 |
| 2003/0091931 A1 | * | 5/2003 | Ogiso et al. ........... 430/270.15 |
| 2003/0194646 A1 | * | 10/2003 | Ogiso et al. ........... 430/270.16 |

FOREIGN PATENT DOCUMENTS

| EP | 1 156 084 A2 | 11/2001 |
| JP | 2000-228028 | 8/2000 |
| JP | 2001-307375 A | 11/2001 |
| WO | WO 01/47719 A1 | 7/2001 |

* cited by examiner

*Primary Examiner*—Elizabeth Mulvaney
(74) *Attorney, Agent, or Firm*—Sughrue Mion, PLLC

(57) ABSTRACT

An optical information recording medium including a substrate, a recording layer, and a cover layer in this order; wherein information is recorded or reproduced by irradiating a laser beam having an wavelength in the range of 380 to 500 nm on the recording layer through a lens having a numerical aperture NA of 0.7 or more; the recording layer includes an organic substance; and the extinction coefficient k of the recording layer is at least 0.1 and less than 0.3.

20 Claims, No Drawings

OPTICAL INFORMATION RECORDING MEDIUM

BACKGROUND OF THE INVENTION

1. Field of the Invention

The present invention relates to an optical information recording medium, and more specifically the present invention relates to a heat mode recordable optical information recording medium.

2. Description of the Related Art

An optical information recording medium (optical disc) that allows recording of information only one time by use of a laser beam is known. The optical disc is also called a recordable CD (so-called CD-R), and typically has a transparent disc-like substrate, a recording layer comprising an organic dye, a reflection layer comprising metal such as gold, and a resinous protection layer (cover layer) in this order. The information is recorded on the CD-R as follows. That is, a laser beam in a near-infrared region (usually a laser beam having a wavelength in the neighborhood of 780 nm) is irradiated to the CD-R, an irradiated portion of the recording layer absorbs the light and is locally heated, thereby causing a physical or chemical change thereof (for instance, formation of a pit), and optical characteristics of the portion are changed. As a result, the recording of the information is realized. On the other hand, the information is also read (reproduced) by irradiating a laser beam having the same wavelength as that of the laser beam used in recording on the CD-R and by detecting difference in reflectance of a portion where the optical characteristics of the recording layer have been changed (recorded portion) and a portion where the optical characteristics have not been changed (unrecorded portion).

In recent years, an optical information recording medium higher in recording density is in demand. In response to such demands, an optical disc called a recordable digital versatile disc (so-called DVD-R) has been proposed (e.g. *Nikkei New Media*, extra issue for "DVD" in 1995). The DVD-R has the following structure. Normally, a recording layer containing an organic dye, a reflection layer, and a protection layer are successively disposed in this order on a transparent disc-like substrate on which a guide groove (pre-groove) for tracking an irradiated laser beam is formed having a width (0.74 to 0.8 μm) as narrow as one half or less that of the CD-R. Two thus formed discs are adhered to each other with the recording layers positioned inward, or the disc and a disc-like protection substrate having the same shape as the disc are adhered with the recording layer positioned inward. The information is recorded on and reproduced from the DVD-R by irradiating a visible laser beam (usually a laser beam having a wavelength in the range of 630 to 680 nm) and can be recorded with a density higher than that of the CD-R.

Recently, networks, such as the Internet, or the like and high-vision TVs are rapidly spreading. Furthermore, High Definition Television (HDTV) broadcasting is to start in the near future. Under such circumstances, a large capacity recording medium that can cheaply and simply record image information is in demand. Although the DVD-R sufficiently plays a role as the large capacity medium under the present circumstances, since the demand for larger capacity and higher density is increasing more and more, it is necessary to develop a recording medium that can cope with these demands. Accordingly, an even larger capacity recording medium that can densely record with light having a wavelength even shorter than that of the DVD-R is under development.

For instance, Japanese Patent Application Laid-Open (JP-A) Nos. 4-74690, 7-304256, 7-304257, 8-127174, 11-53758, 11-334204, 11-334205, 11-334206, 11-334207, 2000-43423, 2000-108513, 2000-113504, 2000-149320, 2000-158818 and 2000-228028 disclose a recording or reproducing method wherein, in an optical information recording medium having a recording layer containing an organic dye, a laser beam having a wavelength of 530 nm or less is irradiated from a recording layer side to a reflection layer side, and information is thereby recorded or reproduced. In the above methods, a laser beam having a blue color (wavelength: 430 nm, 488 nm) or a blue green color (wavelength: 515 nm) is irradiated to an optical disc having a recording layer that contains one of porphyrin compounds, azo dyes, metal azo dyes, quinophthalone dyes, trimethinecyanin dyes, dicyanovinylphenyl skeletal dyes, cumarin compounds, and naphthalocyanin compounds, and the information is thereby recorded or reproduced.

On the other hand, phase-change optical discs are known among DVDs. In the phase-change optical disc, a layer of an alloy, such as GeSbTe or the like, is adopted as a recording layer, the recording layer is instantaneously heated with a laser beam so as to cause a phase change from a crystalline state to an amorphous state and thereby cause a change in reflectance thereof, and the change in reflectance is used to record and reproduce information. Recently, a DVR system in which a blue-violet laser beam is used with the phase change DVD to record and reproduce has been published ([ISOM2000]: pp. 210 to 211). With the advent of this system, a certain degree of success in attaining a higher density can be achieved.

Recently, a DVR in which an organic substance is used in a recording layer thereof has been proposed. However, in the DVR in which an organic substance is used in the recording layer, since the configuration thereof is different from that of the DVD-R and CD-R, even when, for instance, a dye used in an HD-DVD, which does not have a cover layer, is used, a carrier to noise ratio (C/N) is small, thereby making recording impossible.

SUMMARY OF THE INVENTION

The present invention is carried out in view of the above circumstances and intends to attain the followings. That is, the invention intends to provide an optical information recording medium that is large in the carrier to noise ratio (C/N) and stable in recording and reproducing characteristics.

The invention provides an optical information recording medium comprising a substrate, a recording layer, and a cover layer in this order, wherein information is recorded or reproduced by irradiating a laser beam having a wavelength in a range of 380 to 500 nm through a lens having a numerical aperture NA of 0.7 or more; the recording layer comprises an organic substance; and an extinction coefficient k of the recording layer is at least 0.1 and less than 0.3.

DETAILED DESCRIPTION OF THE PREFERRED EMBODIMENTS

An embodiment of an optical information recording medium according to the invention will now be explained. The optical information recording medium according to the invention includes a substrate, a recording layer and a cover layer in this order, and information is recorded or reproduced by irradiating a laser beam having a wavelength in a range of 380 to 500 nm through a lens having a numerical aperture NA of 0.7 or more. The recording layer is a layer of an organic substance, and an extinction coefficient k of the recording layer is at least 0.1 and less than 0.3. Each layer in an embodiment where there is a reflection layer between the substrate and the recording layer will be explained below.

<Substrate>

A material to be used as the substrate can be arbitrarily selected from various kinds of materials that are used as a substrate material for conventional optical information recording mediums.

Examples thereof include glasses; acrylic resins, such as polycarbonates and polymethyl methacrylates; vinyl chloride resins, such as polyvinyl chloride and vinyl chloride copolymers; epoxy resins; amorphous polyolefins; polyesters; and metals, such as aluminum. If necessary, these materials can be used in combination.

Among the above materials, in view of moisture resistance, dimensional stability and price, polycarbonates and amorphous polyolefins are preferable, and the polycarbonates are particularly preferable. Furthermore, a thickness of the substrate is preferably in the range of 0.5 to 1.4 mm.

A guide groove for use in tracking or unevenness (pre-groove) that expresses information such as an address signal is formed on the substrate. In order to attain a higher recording density, it is preferable to use a substrate on which a pre-groove having a track pitch narrower than the track pitches of pre-groves of CD-R and DVD-R is formed. The track pitch of the pre-groove is in the range of 300 to 600 nm. Furthermore, a depth of the pre-groove (depth of the groove) is in the range of 40 to 150 nm.

An undercoat layer is preferably formed on a substrate surface side on which a reflection layer described later is disposed, for the purposed of improving surface flatness and adhesion.

Examples of materials of the undercoat layer include polymer such as polymethyl methacrylates, acrylic acid/methacrylic acid copolymers, styrene/maleic acid anhydride copolymers, polyvinyl alcohols, N-methylol acrylamides, styrene/vinyltoluene copolymers, chlorosulfonated polyethylenes, nitrocellulose, polyvinyl chlorides, chlorinated polyolefins, polyesters, polyimides, vinyl acetate/vinyl chloride copolymers, ethylene/vinyl acetate copolymers, polyethylenes, polypropylenes, and polycarbonates; and a surface modification agent such as a silane coupling agent.

The undercoat layer can be formed by dissolving or dispersing the above material in an appropriate solvent to prepare a coating solution, and coating the coating solution on a substrate surface by use of a coating method such as spin coating, dip coating and extrusion coating. A thickness of the undercoat layer is generally in the range of 0.005 to 20 $\mu$m, and preferably in the range of 0.01 to 10 $\mu$m.

<Reflection Layer>

In the reflection layer, a light reflective material having a high reflectance to a laser beam is used. The reflectance is 70% or more.

Examples thereof include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi, and stainless steel. These light reflective materials may be used alone, or in combination, or as an alloy thereof. Among these, Cr, Ni, Pt, Cu, Ag, Au, Al and stainless steel are preferable. Au, Ag, Al and alloys thereof are particularly preferable, and Au, Ag and alloys thereof are the most preferable.

The reflection layer can be formed by vapor-depositing, sputtering or ion implanting at least one of the aforementioned light reflective materials on the substrate. A thickness of the reflection layer is generally in the range of 10 to 300 nm, and preferably in the range of 50 to 200 nm.

The above reflection layer is not necessarily needed when the reflectance of a recording layer described later is sufficiently high.

<Recording Layer>

The recording layer is a layer of an organic substance formed on the above reflection layer. The layer of organic substance has the extinction coefficient k of at least 0.1 and less than 0.3 and can record and reproduce information by use of a laser beam having a wavelength in the range of 380 to 500 nm and a lens having a numerical aperture NA of 0.7 or more. Since the extinction coefficient k is at least 0.1 and less than 0.3, the C/N can become large at the time of recording.

Furthermore, the extinction coefficient k can be measured as follows. That is, a solution of the organic substance is placed on a mirror finished-surface replica so as to cover substantially a half of the surface and spin-coated to form a layer. After incident angles are measured in various conditions by use of an automatic wavelength scanning ellipsometer (MEL-30S) manufactured by JASCO Corporation, the extinction coefficient is determined in a condition in which focusing state is good.

When the extinction coefficient k is less than 0.1, the light is less absorbed and the recording is not attained. On the other hand, when the extinction coefficient is 0.3 or more, the light is too much absorbed to obtain sufficient reflectance.

The organic substance is preferably at least one of phthalocyanin compounds, porphyrin compounds, triazole compounds, aminobutadiene compounds, and cyanin compounds. The phthalocyanin compounds is preferably at least one of those having an alkoxy, sulfonamide, sulfomoyl, or sulfonate group.

In addition, dyes disclosed in JP-A Nos. 4-74690, 8-127174, 11-53758, 11-334204, 11-334205, 11-334206, 11-334207, 2000-43423, 2000-108513, and 2000-158818 can be used together with the above-described organic substance.

Furthermore, the dyes are not restricted to the above ones. Organic compounds such as triazole compounds, triazine compounds, cyanin compounds, melocyanin compounds, aminobutadiene compounds, phthalocyanin compounds, cinnamic acid compounds, viologen compounds, azo compounds, oxonolbenzooxazole compounds, and benzotriazole compounds can be also favorably used. Among these compounds, benzotriazole compounds, cyanin compounds, aminobutadiene compounds, and phthalocyanin compounds are particularly preferable.

The recording layer is formed as follows. That is, the recording material such as the above dye (organic substance or the like), and a binder and the like are dissolved in an appropriate solvent to prepare a recording layer coating solution. Subsequently, the recording layer coating solution is coated on a reflection layer formed on a substrate surface and then dried, and the recording layer is thereby formed. The concentration of the recording material in the recording layer coating solution is generally in the range of 0.01 to 15% by mass, preferably in the range of 0.1 to 10% by mass, more preferably in the range of 0.5 to 5% by mass, and most preferably in the range of 0.5 to 3% by mass.

Furthermore, the method for dissolving the recording material and the like can use ultrasonic wave, homogenizer, and/or heating.

Examples of the solvent used in the recording layer coating solution include esters such as butyl acetate, methyl lactate, ethyl lactate, and cellosolve acetate; ketones such as methyl ethyl ketone, cyclohexanone, and methyl isobutyl ketone; chlorinated hydrocarbons such as dichloromethane, 1,2-dichloroethane, and chloroform; amides such as dimethylformamide; hydrocarbons such as methylcyclohexane; ethers such as tetrahydrofuran, ethyl ether, dioxane; alcohols such as ethanol, n-propanol, isopropanol, n-butanol, and diacetone alcohol; fluorine-containing solvents such as 2,2,3,3-tetrafluoropropanol; and glycol ethers such as ethylene glycol monomethyl ether, ethylene glycol monoethyl ether, and propylene glycol monomethyl ether.

The above solvents can be used alone or in combination in view of the solubility of the recording material used. The coating solution may contain various kinds of additives such as an anti-oxidant, a UV absorbent, a plasticizer and a lubricant according to the object.

When a binder is used, examples of the binder include natural organic polymer such as gelatin, cellulose derivatives, dextran, rosin, and rubber; synthetic organic polymer including hydrocarbon resins such as polyethylene, polypropylene, polystyrene, and polyisobutylene; vinyl resins such as polyvinyl chloride, polyvinylidene chloride, and vinyl chloride/vinyl acetate copolymer; acrylic resins such as polymethyl acrylate, and polymethyl methacrylate; polyvinyl alcohol; chlorinated polyethylene; epoxy resin; butyral resin; rubber derivatives; and initial condensation products of thermosetting resins such as phenol-formaldehyde resin. when the binder is used in the recording layer, an amount of the binder used is generally 0.01 times to 50 times (by mass), and preferably 0.1 times to 5 times (by mass) as many as that of the recording material. The concentration of the recording material in thus prepared coating solution is generally in the range of 0.01 to 10% by mass, and preferably in the range of 0.1 to 5% by mass.

The coating methods can be a spray coating method, a spin coating method, a dip coating method, a roll coating method, a blade coating method, a doctor roll coating method and a screen-printing coating method. The recording layer may be formed into a single layer or multi-layers. A thickness of the recording layer is generally in the range of 20 to 500 nm, preferably in the range of 30 to 300 nm, and more preferably in the range of 50 to 100 nm.

Furthermore, the coating temperature is generally 23 to 50° C., preferably 24 to 40° C., and more preferably 25 to 37° C. in view of viscosity control.

In order to prevent the warpage of the disc, a UV light irradiation to a coated film is preferably carried out with a pulse type light irradiator (preferably a UV irradiator). A pulse duration is preferably msec or less, and more preferably psec or less. An amount of irradiation light for one pulse is not particularly restricted, and is preferably 3 kW/cm$^2$ or less, and more preferably 2 kW/cm$^2$ or less.

Furthermore, the number of times of irradiation is not restricted, but is preferably 20 times or less, and more preferably 10 times or less.

The recording layer may contain any discoloration preventing agent in order to improve light stability of the recording layer.

A singlet oxygen quencher is generally used as the discoloration preventing agent. Known ones that are disclosed in publications such as patent specifications and the like can be used as the singlet oxygen quencher.

Specific examples thereof include those disclosed in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, and 4-25492, Japanese Patent Application Publication (JP-B) Nos. 1-38680 and 6-26028, German Patent No. 350399, and Journal of the Chemical Society of Japan, No. 10 (1992) p.1141.

An amount of the discoloration preventing agent such as the singlet oxygen quencher is usually in the range of 0.1 to 50% by mass relative to an amount of the recording compound, preferably in the range of 0.5 to 45% by mass, more preferably in the range of 3 to 40% by mass, and particularly preferably in the range of 5 to 25% by mass.

<Adhesion Layer>

An adhesion layer may be formed to improve adhesion between the recording layer and a cover layer described later.

A material of the adhesion layer is preferably a photo-curable resin. In order to prevent the disc from warping, those that are small in contraction percentage when hardened are preferable. Examples of such photo-curable resin include UV-curable resins (UV-curable adhesive) such as "SD-640", "SD-347" manufactured by Dainippon Ink and Chemicals, Incorporated. Furthermore, a thickness of the adhesion layer is preferably in the range of 1 to 1000 $\mu$m, more preferably in the range of 5 to 500 $\mu$m, and particularly preferably in the range of 10 to 100 $\mu$m in order to provide elasticity.

Other examples of the material of the adhesion layer include a resin that is cured by irradiating radiation thereto and has two or more of radiation-sensitive double bonds in a molecule. Examples of such a resin include acrylic acid esters, acrylamides, methacrylic acid esters, methacrylic amides, allyl compounds, vinyl ethers, and vinyl esters. Acrylate compounds and methacrylate compounds having two or more functional groups are preferable.

Specific examples of resins having two functional groups include those obtained by adding acrylic acid or methacrylic acid to aliphatic diols. The typical aliphatic diols include ethylene glycol diacrylate, propylene glycol diacrylate, butanediol acrylate, hexanediol diacrylate, diethylene glycol diacrylate, triethylene glycol diacrylate, tetraethylene glycol diacrylate, neopentylglycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentylglycol dimethacrylate, and tripropylene glycol dimethacrylate.

In addition, polyether acrylates and polyether methacrylates that can be obtained by adding acrylic acid or methacrylic acid to polyether polyols such as polyethylene glycol and polypropylene glycol, and polytetramethylene glycol, and polyester acrylates and polyester methacrylates that are obtained by adding acrylic acid or methacrylic acid to polyester polyols that are obtained from a known dibasic acid and glycol can be used as the aliphatic diol.

Furthermore, polyurethane acrylates and polyurethane methacrylates that are obtained by adding acrylic acid or methacrylic acid to polyurethanes obtained by reacting a known polyol and/or diol with an isocyanate may be used.

Furthermore, those that are obtained by adding acrylic acid or methacrylic acid to bisphenol A, bisphenol F, hydrogenated bisphenol A, hydrogenated bisphenol F and alkyleneoxide adducts thereof, those that have a cyclic structure such as isocyanuric acid alkyleneoxide-modified diacrylates, isocyanuric acid alkyleneoxide-modified dimethacrylates, tricyclodecane dimethanol diacrylates, and tricyclodecane dimethanol dimethacrylates can be used.

An electron beam and ultraviolet light can be used as the radiation. When the ultraviolet light is used, it is necessary to add a photo-polymerization initiator to the following compounds. An aromatic ketone can be used as the photo-polymerization initiator. The aromatic ketone is not particularly restricted, but generates a bright line of a mercury-arc lamp that is usually used as an ultraviolet light source. Those that have a relatively large absorption coefficient in the wavelengths of 254, 313, and 865 nm are preferable. Typical examples thereof include acetophenone, benzophenone, benzoin ethyl ether, benzyl methyl ketal, benzyl ethyl ketal, benzoin isobutyl ketone, hydroxydimethyl phenyl ketone, 1-hydroxycyclohexyl phenyl ketone, 2,2-diethoxyacetophenone, and Michler's ketone, that is, various aromatic ketones can be used. A mixing ratio of aromatic ketone is in the range of 0.5 to 20 parts by mass with respect to 100 parts by mass of the compound (a), preferably in the range of 2 to 15 parts by mass, and more preferably in the range of 3 to 10 parts by mass. Ultraviolet curable adhesives that contain in advance the photo-polymerization initiator are commercially available, and may be used. The mercury-arc lamp can be used as the ultraviolet light source. The mercury-arc lamp of 20 to 200 W/cm is used at a rate of 0.3 to 20 m/min. A distance between a substrate and the mercury-arc lamp is in general preferably in the range of 1 to 30 cm.

As an electron beam accelerator, one according to a scanning method, a double scanning method, or a curtain beam method can be adopted. However, preferable one is the curtain beam method by which a large power can be obtained relatively inexpensively. As for the electron beam characteristics, an acceleration voltage is in the range of 100 to 1000 kV, and preferably in the range of 150 to 300 kV, and an amount of beam absorbed is in the range of 0.5 to 20 Mrad, and preferably in the range of 1 to 10 Mrad. When the acceleration voltage is less than 100 kV, an amount of transmitted energy is deficient, and when it exceeds 1000 kV, since energy efficiency in the polymerization becomes lower, price-competitiveness deteriorates.

<Cover Layer>

The cover layer is formed so as to hinder moisture from entering into the inside of the optical information recording medium. The material of the cover layer is not restricted so long as it is transparent, but is preferably polycarbonate or cellulose triacetate, and more preferably one whose moisture absorptivity at 23° C. and 50% RH is 5% or less.

Here, "transparent" means a state that allows a recording light and reproducing light to pass through the cover layer (transmittance: 90% or more).

The cover layer is formed as follows. A photo-curable resin that constitutes the adhesion layer is dissolved in an appropriate solvent, and a coating solution is thereby prepared. The coating solution is coated on the recording layer at a predetermined temperature and a coated film is formed. A cellulose triacetate film (TAC film) that is obtained by, for instance, extrusion molding a plastic is laminated on this coated film. Light is irradiated from the laminated TAC film side to cure the coated film, and the cover layer is thereby formed. The TAC film preferably contains an ultraviolet light absorbent. A thickness of the cover layer is in the range of 0.01 to 0.2 mm, preferably in the range of 0.03 to 0.1 mm, and more preferably in the range of 0.05 to 0.095 mm.

As mentioned above, in the embodiment, although a transparent film-like material is adhered by use of an adhesive to form the cover layer, the cover layer may be solely made of the adhesive (adhesive layer).

Furthermore, the optical information recording medium can have a layer of dielectric substance or a light-transmitting layer between the reflection layer and the recording layer in accordance with the characteristics of the recording layer. For instance, a light-transmitting layer for improving adhesion with the recording layer and the reflection layer may be disposed, and when a phase change type recording layer is disposed, a layer of a dielectric substance for heat dissipation may be disposed.

For the layer of a dielectric substance, one of materials made of nitride, oxide, carbide and sulfide of Zn, Si, Ti, Te, Sn, Mo and Ge may be preferably used, and $ZnS-SiO_2$ may also be used.

For the light-transmitting layer, any material that has transmittance of 90% or more at a laser wavelength can be used.

The layer of a dielectric substance or the light-transmitting layer can be formed according to known methods. A thickness of the layer of a dielectric substance is preferably in the range of 1 to 100 nm, and a thickness of the light-transmitting layer is preferably in the range of 2 to 50 nm.

EXAMPLES

Examples of the present invention will be detailed. However, the invention is not restricted thereto.

Examples 1 Through 6, Comparative Examples 1 and 2

Silver was sputtered on a spirally grooved surface of injection-molded polycarbonate resin (Trade Name: Panlite AD5503 manufactured by Teijin Limited) substrate that had a thickness of 1.1 mm and a diameter of 120 mm to form a reflection layer having a thickness of 120 nm. Thereafter, each of organic substances shown in the following respective examples and comparative examples was mixed with methyl lactate or 2,2,3,3-tetrafluoropropanol so that the concentration thereof was 4%, and an ultrasonic wave was applied to the resultant mixture for 2 hours, and a dye coating solution was thereby prepared. The dye coating solution was coated by the spin coating method while varying the number of rotation from 300 to 4000 rpm at 23° C. and 50% RH. Thereafter, the coating layer was annealed at room temperature for two hours, $ZnS-SiO_2$ was sputtered to have a thickness of 5 nm, a UV curable adhesive (Trade Name: SD-640 manufactured by Dainippon Ink and Chemicals, Incorporated) was spin-coated at 100 to 300 rpm, and a polycarbonate sheet (Trade Name: Pureace manufactured by Teijin Limited, film thickness; 70 $\mu$m) was superposed. While varying the number of rotation from 300 to 4000 rpm, the UV curable adhesive was spread over an entire surface. Ultraviolet light was irradiated from a UV lamp to cure the UV curable adhesive, and each of samples of examples and comparative examples was thereby prepared.

Example 1
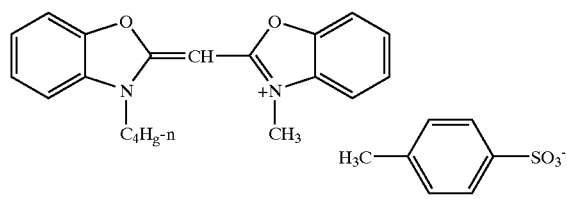
Example 2
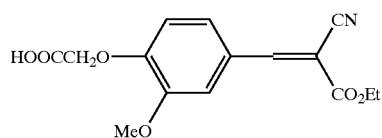
Example 3
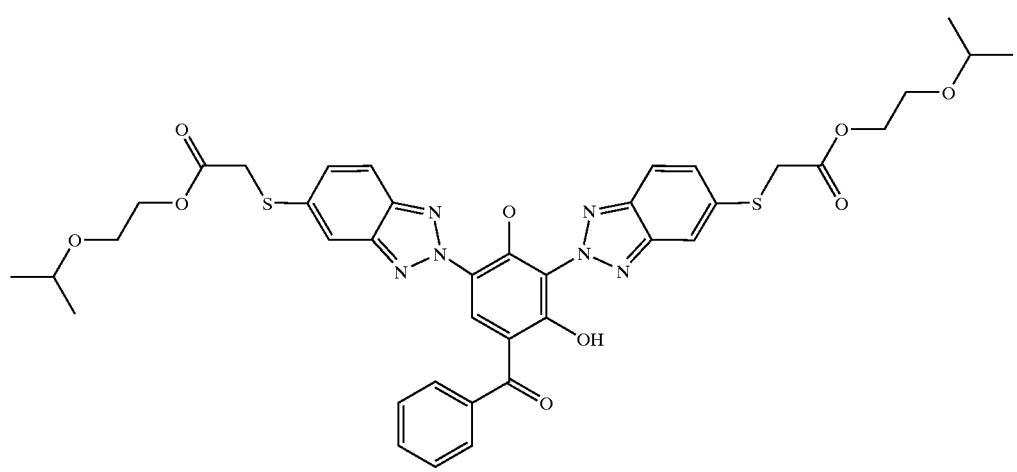
Example 4
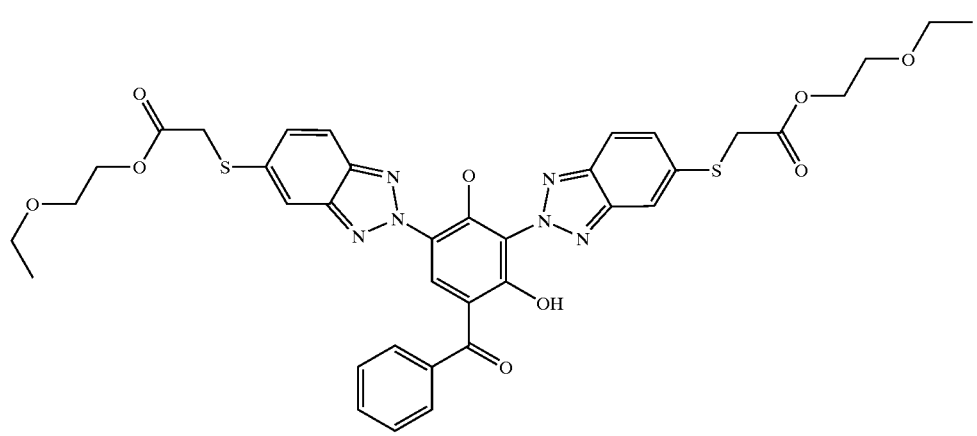
Example 5
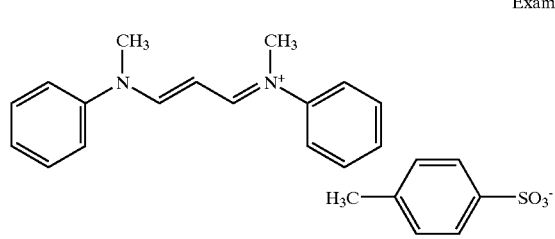
Example 6
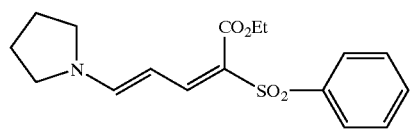
Comparative example 1
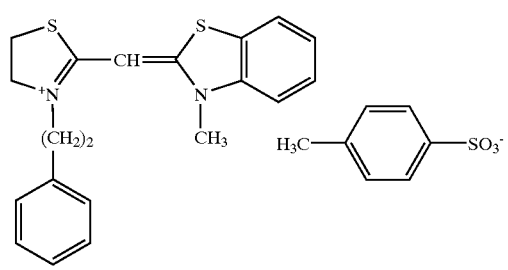
Comparative example 2
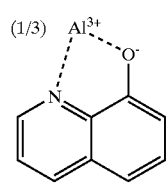

<Evaluation>

With DDU-1000 (manufactured by Pulstec Industrial Co., Ltd.) that incorporated a laser beam source having a wavelength of 405 nm and a lens NA of 0.85, 3T signal was recorded at 6 mW on each of the optical information recording mediums according to the examples and comparative examples, and the C/N thereof was measured. Results are shown in Table 1.

TABLE 1

|  | Extinction coefficient k | C/N (dB) |
|---|---|---|
| Example 1 | 0.104 | 42 |
| Example 2 | 0.15 | 49 |
| Example 3 | 0.1602 | 50 |
| Example 4 | 0.2 | 52 |
| Example 5 | 0.2608 | 45 |
| Example 6 | 0.29 | 41 |
| Comparative example 1 | 0.3379 | 31 |
| Comparative example 2 | 0.0951 | 0 |

From table 1, it is found that in all of the optical information recording mediums according to Examples 1 through 6, the extinction coefficients are at least 0.1 and less than 0.3, and the carrier to noise ratios are high. On the contrary, in the optical information recording mediums according to Comparative examples 1 and 2, the extinction coefficients k are less than 0.1 or more than 0.3 and the carrier to noise ratios are lower.

What is claimed is:

1. An optical information recording medium comprising a substrate, a recording layer, and a cover layer in this order, wherein information is recorded or reproduced by irradiating a laser beam having a wavelength in a range of 380 to 500 nm through a lens having a numerical aperture NA of 0.85 or more;

the recording layer comprises an organic substance; and
an extinction coefficient k of the recording layer is at least 0.1 and less than 0.3.

2. The optical information recording medium according to claim 1, wherein the extinction coefficient k is 0.15 to 0.25.

3. The optical information recording medium according to claim 1, wherein the organic substance is at least one selected from the group consisting of triazole compounds, porphyrin compounds, cyanine compounds, aminobutadiene compounds, and phthalocyanine compounds.

4. The optical information recording medium according to claim 2, wherein the organic substance is at least one selected from the group consisting of triazole compounds, porphyrin compounds, cyanine compounds, aminobutadiene compounds, and phthalocyanine compounds.

5. The optical information recording medium according to claim 1, wherein the organic substance is at least one selected from the group consisting of benzotriazole compounds, cyanine compounds, aminobutadiene compounds, and phthalocyanine compounds.

6. The optical information recording medium according to claim 2, wherein the organic substance is at least one selected from the group consisting of benzotriazole compounds, cyanine compounds, aminobutadiene compounds, and phthalocyanine compounds.

7. The optical information recording medium according to claim 1, wherein the organic substance is at least one selected from the following compounds:

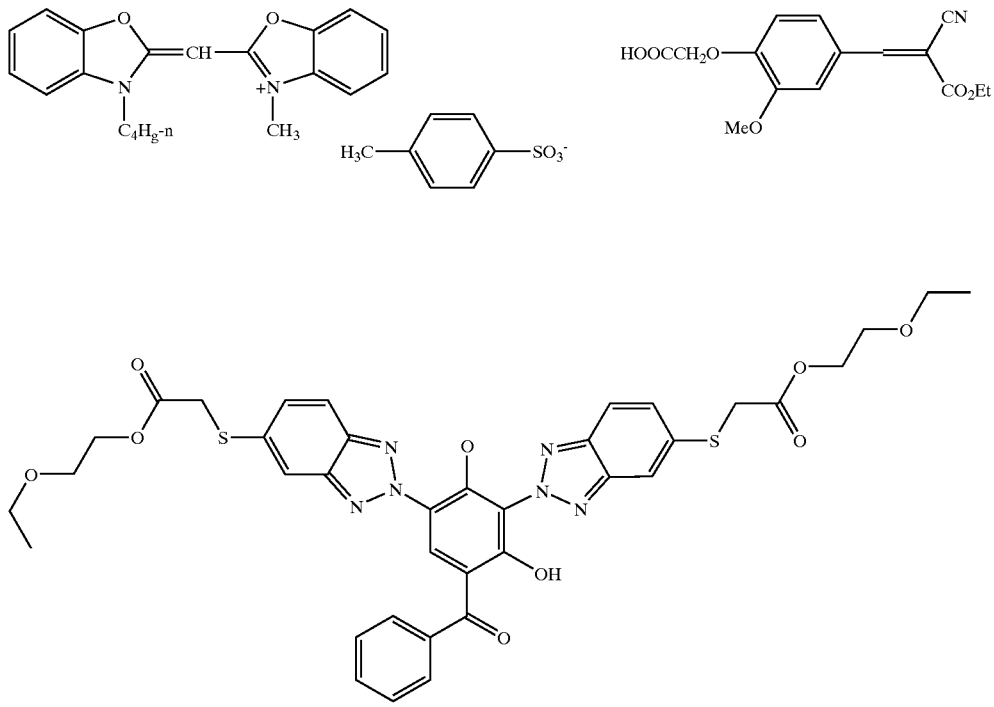

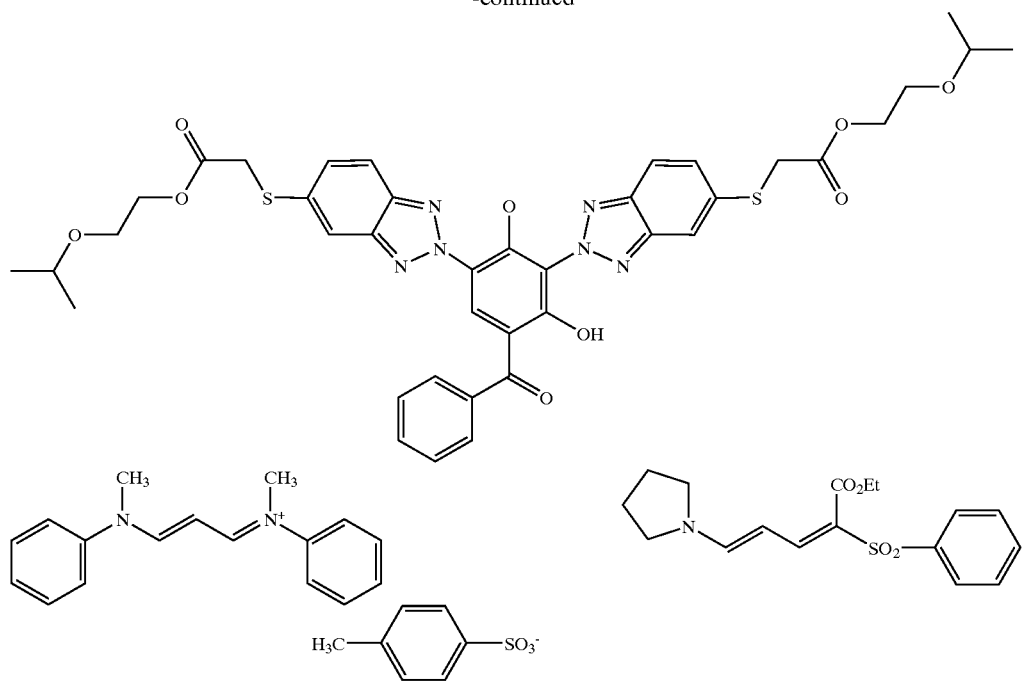

8. The optical information recording medium according to claim 7, wherein the extinction coefficient k is 0.15 to 0.25.

9. The optical information recording medium according to claim 1, further comprising a reflection layer between the substrate and the recording layer.

10. The optical information recording medium according to claim 2, further comprising a reflection layer between the substrate and the recording layer.

11. The optical information recording medium according to claim 3, further comprising a reflection layer between the substrate and the recording layer.

12. The optical information recording medium according to claim 5, further comprising a reflection layer between the substrate and the recording layer.

13. The optical information recording medium according to claim 7, further comprising a reflection layer between the substrate and the recording layer.

14. The optical information recording medium according to claim 8, further comprising a reflection layer between the substrate and the recording layer.

15. The optical information recording medium according to claim 1, further comprising an adhesion layer between the recording layer and the cover layer.

16. The optical information recording medium according to claim 2, further comprising an adhesion layer between the recording layer and the cover layer.

17. The optical information recording medium according to claim 3, further comprising an adhesion layer between the recording layer and the cover layer.

18. The optical information recording medium according to claim 5, further comprising an adhesion layer between the recording layer and the cover layer.

19. The optical information recording medium according to claim 7, further comprising an adhesion layer between the recording layer and the cover layer.

20. The optical information recording medium according to claim 8, further comprising an adhesion layer between the recording layer and the cover layer.

* * * * *